July 20, 1937.　　　C. L. CUMMINS　　　2,087,430
CYLINDER HEAD GASKET
Filed Feb. 6, 1936
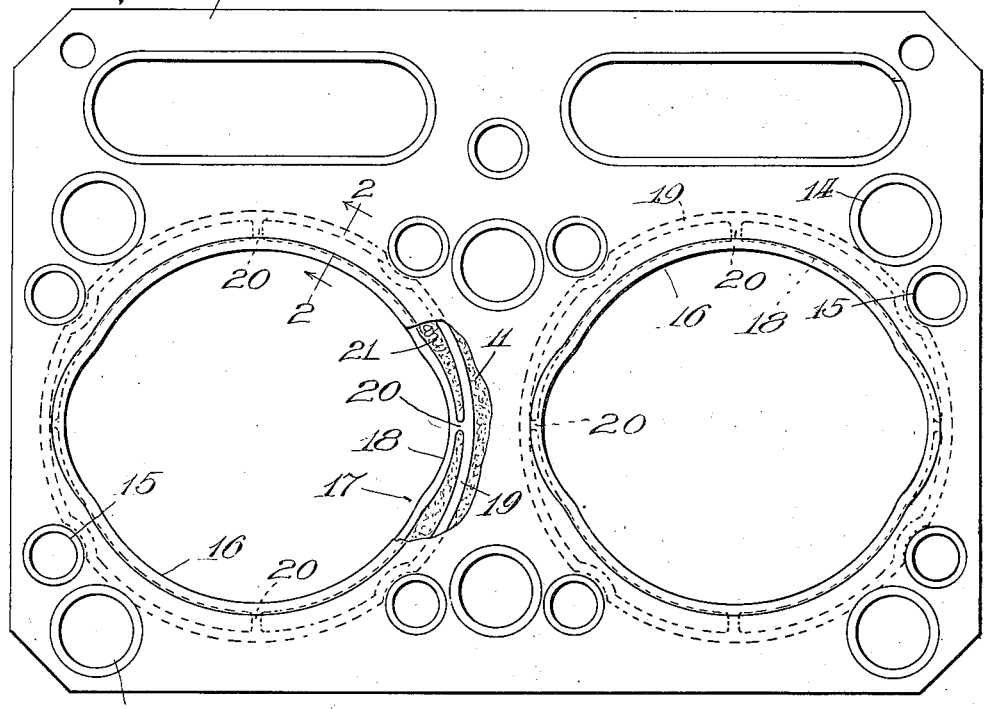
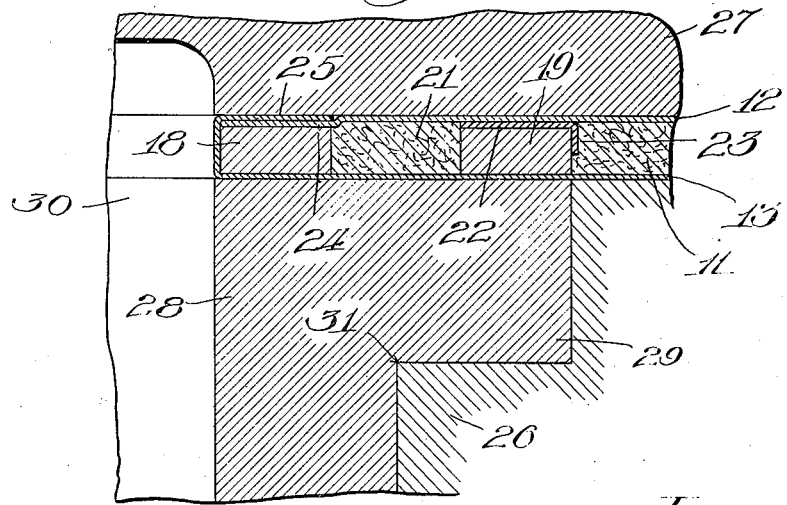
Inventor:
Clessie L. Cummins
by Davis, Lindsey, Smith & Shonts, Attys.

Patented July 20, 1937

2,087,430

UNITED STATES PATENT OFFICE 2,087,430

CYLINDER HEAD GASKET

Clessie L. Cummins, Columbus, Ind., assignor to Oil Engine Development Company, Columbus, Ind., a corporation of Indiana Application February 6, 1936, Serial No. 62,565

4 Claims. (Cl. 288—1)

My invention relates to cylinder head gaskets for internal combustion engines and more particularly to a device of this character for adequately sealing combustion chambers against high pressure.

Cylinder head gaskets are commonly made of copper clad sheets of asbestos or similar material that are suitably perforated for registration with the cylinder bores, cooling water ports and the cap screws or studs that hold the cylinder heads in position. In this construction, the copper sheets directly touch the opposing faces of the cylinder head and block and the asbestos provides a yieldable, heat-resistant body which insures an intimate sealing contact of the copper with these faces when the head is secured in position. The critical sealing locations exist around the cylinder bores due to the exposure of the perforated gasket edges to the compression and explosion pressures in the combustion chambers and gaskets which are not reenforced by grommeting frequently lose their effectiveness because of the "blowing away" of the asbestos by the pressure. In Diesel engine practice, this problem is particularly serious and grommeting has not proved entirely satisfactory because of its low structural strength due to the thin copper employed and the higher pressures encountered, relative to those present in gasoline engines, compression pressures, for example, being of the order of 500 to 550 pounds per square inch, while the working pressure after ignition or explosion is of the order of 750 pounds per square inch. Under conditions of careless starting, the pressure in the combustion chamber may rise as high as 1000 to 1500 pounds per square inch.

It is therefore the principal object of my invention to devise a cylinder head gasket which is definitely reenforced around each opening which registers with the combustion chamber end of a cylinder bore by a member embodying sufficient strength to resist pressures in the chamber and sufficient flexibility to respond to the pressure exerted by the cylinder head and thus provide the required seal.

A further object is to devise a gasket of the character indicated in which the reenforcement is provided by a metallic dam having a sectional strength that is considerably greater than the usual grommet, while embodying sufficient flexibility to readily accommodate itself to the clamping pressure of a cylinder head.

In the drawing:

Figure 1 is a plan view of a typical cylinder head gasket for a block composed of cylinders cast in pairs and which is partially broken away to show my improved reenforcing.

Fig. 2 is an enlarged section taken along the line 2—2 in Fig. 1, looking in the direction of the arrows, and additionally showing the gasket in position between a cylinder head and block.

Referring to the drawing, the numeral 10 designates my improved gasket which is composed of the usual sheet of asbestos or other yieldable, heat-resistant material having an approved thickness and which is overlaid by top and bottom metallic sheets 12 and 13, respectively, which are ordinarily composed of copper. The customary apertures 14 and 15 for the passage therethrough of the hold-down studs and cooling water, respectively, are provided in the gasket 10 and these apertures may be grommeted in the usual manner. As just described, the gasket is of the common construction heretofore employed in the art and the features indicated in and of themselves form no part of the present invention which more particularly applies to the reenforcing of that gasket opening, denoted by the numeral 16, which registers with the combustion chamber end of a cylinder bore.

This improved reenforcing is generally indicated by the numeral 17 and it comprises a continuous, inner metallic ring 18 whose inside diameter may be approximately equal to or slightly greater than the diameter of the cylinder bore, and an outer, metallic ring 19 that is connected to the ring 18 at a plurality of points around the reenforcing, as by the short necks 20. The intervening spaces between the rings and necks may be filled with a suitable heat-resistant material 21 and preferably with the same material as comprises the rest of the sheet 11.

As clearly indicated in Fig. 2, the rings 18 and 19 are preferably ribbon-like in shape and the thickness of each ring may approximate that of, or be slightly less than, the thickness of the asbestos sheet 11, or, in other words, and as clearly illustrated in Fig. 2, the gasket is characterized by a full metallic section in the region of the rings 18 and 19.

The rings 18 and 19 rest directly on the lower sheet 13 and an annular filler ring 22 is interposed between the top side of the ring 19 and the top sheet 12 in order to build the section through the gasket in this location up to the thickness defined by the asbestos sheet 11 and the top and bottom sheets 12 and 13. The ring 22 may include an annular flange 23 which is bent into engagement with the outer face of the ring 19. The sheet 12 around the opening 16 is offset, as indicated by the numeral 24, into direct contact with the top surface of the ring 18 and the bottom sheet 13 is then bent around the inner face of the ring 18 into overlying engagement with the portion 24 of the top sheet 12 as at 25, thus securely anchoring the reenforcing in position relative to the remainder of the gasket.

As indicating appropriate dimensions for one type of gasket intended for use with a definite size engine, it may be pointed out that an oil burning engine having a bore of 4⅞ inches may require a cylinder head gasket in which the thickness of the reenforcement 17 would be of the order of .050 inch, with the width of each ring being of the order of 7/64 of an inch, the spacing between the rings averaging 9/32 of an inch. The total thickness of the gasket would be about .090 inch and the thickness of the top and bottom sheets of the gasket would be of the order of .010 inch. These dimensions are illustrative only and are not to be regarded as precluding the choice of other dimensions as operative requirements may dictate.

In Fig. 2, a gasket of the foregoing type is illustrated in position between a cylinder block 26 and a cylinder head 27. In this particular construction, the cylinder bore is provided in a separate sleeve 28 having an outwardly extending, top flange 29 which seats against an appropriate shoulder provided in the block. The numeral 30 designates the combustion chamber of the cylinder.

It can be readily understood from an examination of Fig. 2, that the reenforcement 17 provides a very definite, metallic dam-like structure that insures a very effective sealing contact between the cylinder head and block and also embodies sufficient metal to resist any pressure in the combustion chamber of an oil engine. The stretching action in each ring 18 and 19 that is induced by the radially acting pressure in the combustion chamber is effectively resisted by the tensional strength of the ribbon-like rings 18 and 19, so that this reenforcing provides a much stronger structural design than that heretofore provided by the customary grommet wherein the metal employed is substantially of the thickness of the top and bottom sheets of the gasket. This increased strength and resistance to pressure, however, is not obtained at the sacrifice of flexibility so that the portion of the gasket around the reenforcing conforms readily to any inequalities in the opposed surfaces of the cylinder head and block when the head is drawn into position, thus insuring a water and gas-tight seal in this region of the gasket. This flexibility is not only obtained by appropriately disposing the metal in each ring 18 and 19, but is also permitted by the reenforcement as a whole, because of its skeleton-like construction and the capacity for relative movement of the rings 18 and 19.

This style of reenforcing is particularly desirable for engines provided with the separate sleeve type of bore illustrated in Fig. 2. It has been ascertained that, where the principal pressure is applied to the sleeve relatively close to the bore face thereof, the sleeve has a tendency to crack beginning at the point indicated by the numeral 31 and extending through the sleeve to the bore, because of the offset location of the pressure application to the support provided by the flange 29. In my improved construction, this problem is effectively solved by the dual ring construction of the reenforcing, since one of the rings is directly located above the flange 29, and thus serves to not only reduce the unit pressure on the upper end of the sleeve, but also to better distribute the total force across the top end of the sleeve.

I claim:

1. A cylinder head gasket comprising a sheet of heat-resistant material, a metallic reenforcing member having spaced, inner and outer continuous elements connected by narrow necks providing for flexibility of the member as a unit, the inner member defining an opening in the sheet for registration with a cylinder bore and the thickness of the member approximating that of the sheet, and metallic sheathing enclosing the sheet and member and having apertures coinciding with the member opening.

2. A cylinder head gasket comprising a sheet of heat-resistant material, a metallic reenforcing member having spaced, inner and outer continuous elements connected by narrow necks providing for flexibility of the member as a unit, the material filling the spaces between the elements and the inner element defining an opening in the sheet for registration with a cylinder bore, the thickness of the member approximating that of the sheet, and metallic sheathing enclosing the sheet and member and having apertures coinciding with the member opening.

3. A cylinder head gasket comprising a sheet of heat-resistant material, a metallic reenforcing member having spaced, inner and outer continuous elements connected by narrow necks providing for flexibility of the member as a unit, the inner member defining an opening in the sheet for registration with a cylinder bore, and metallic sheathing enclosing the sheet and member and having apertures coinciding with the member opening.

4. A cylinder head gasket for an engine including a bore provided by a sleeve having an outwardly flanged head for supporting the same in the engine block, comprising a jacket formed of a pair of spaced sheets of metal and having an aperture for registering with the bore, a reenforcing member located between the sheets and around the aperture, comprising a pair of spaced inner and outer metallic rings, the inner ring being adapted to seal the space immediately around the bore between the sleeve and the cylinder head and the outer ring being adapted for positioning adjacent the outer edge of the sleeve head to thereby distribute the total pressure of the cylinder head on the sleeve head, devices for maintaining the spacing of the rings, and packing material lying between the rings.

CLESSIE L. CUMMINS.